United States Patent
Di Pietro et al.

(10) Patent No.: US 9,369,351 B2
(45) Date of Patent: Jun. 14, 2016

(54) USING LEARNING MACHINE-BASED PREDICTION IN MULTI-HOPPING NETWORKS

(71) Applicant: Cisco Technology, Inc., San Jose, CA (US)

(72) Inventors: Andrea Di Pietro, Lausanne (CH); Jean-Philippe Vasseur, Saint Martin d'Uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 14/164,507

(22) Filed: Jan. 27, 2014

(65) Prior Publication Data

US 2015/0195216 A1     Jul. 9, 2015

Related U.S. Application Data

(60) Provisional application No. 61/923,910, filed on Jan. 6, 2014.

(51) Int. Cl.
*H04L 12/24* (2006.01)
*H04L 12/805* (2013.01)
*H04W 24/02* (2009.01)
*H04L 12/751* (2013.01)
*H04L 12/803* (2013.01)
*H04L 12/26* (2006.01)
(Continued)

(52) U.S. Cl.
CPC ............ *H04L 41/5025* (2013.01); *H04L 45/02* (2013.01); *H04L 47/122* (2013.01); *H04L 47/365* (2013.01); *H04W 24/02* (2013.01); *H04L 43/0852* (2013.01); *H04L 45/70* (2013.01); *H04W 24/04* (2013.01)

(58) Field of Classification Search
None
See application file for complete search history.

(56) References Cited

U.S. PATENT DOCUMENTS 6,577,597 B1   6/2003   Natarajan et al.
6,694,471 B1   2/2004   Sharp
6,769,024 B1   7/2004   Natarajan et al.
(Continued)

OTHER PUBLICATIONS

Fan, N., "Learning Nonlinear Distance Functions Using Neural Network for Regression with Application to Robust Human Age Estimation", IEEE International Conference on Computer Vision (ICCV), Nov. 2011, pp. 249-254, Institute of Electrical and Electronics Engineers, Barcelona, Spain.
(Continued)

*Primary Examiner* — Min Jung
(74) *Attorney, Agent, or Firm* — Parker Ibrahim & Berg LLC; James M. Behmke; Stephen D. LeBarron (57) ABSTRACT

In one embodiment, statistical information is collected relating to one or both of communication link quality or channel quality in a frequency-hopping network, in which packets are sent according to a frequency-hopping schedule that defines one or more timeslots, each timeslot corresponding to a transmission frequency. Also, a performance metric of a particular transmission frequency corresponding to a scheduled timeslot is predicted based on the collected statistical information. Based on the predicted performance metric, it is determined whether a transmitting node in the frequency-hopping network should transmit a packet during the scheduled timeslot using the particular transmission channel or wait until a subsequent timeslot to transmit the packet using another transmission frequency.

21 Claims, 6 Drawing Sheets

(51) Int. Cl.
*H04W 24/04* (2009.01)
*H04L 12/721* (2013.01)

(56) References Cited

U.S. PATENT DOCUMENTS

| | | | |
|---|---|---|---|
| 6,785,239 B1 | 8/2004 | Tasker | |
| 6,886,040 B1 | 4/2005 | Fitzgerald | |
| 6,961,573 B1 | 11/2005 | Moon et al. | |
| 6,973,034 B1 | 12/2005 | Natarajan et al. | |
| 7,092,410 B2 | 8/2006 | Bordonaro et al. | |
| 7,457,877 B1 | 11/2008 | Shah et al. | |
| 7,568,045 B1 | 7/2009 | Agrawal | |
| 7,606,895 B1 | 10/2009 | Dini et al. | |
| 7,613,128 B2 | 11/2009 | Castagnoli et al. | |
| 7,680,047 B2 | 3/2010 | Vadlakonda et al. | |
| 7,724,676 B2 | 5/2010 | Gerstel et al. | |
| 7,948,910 B2 | 5/2011 | Arbel et al. | |
| 8,005,000 B1 | 8/2011 | Srinivasan | |
| 8,369,213 B2 | 2/2013 | Vasseur et al. | |
| 8,605,591 B2 | 12/2013 | Shaffer et al. | |
| 8,630,177 B2 | 1/2014 | Vasseur et al. | |
| 8,630,291 B2 | 1/2014 | Shaffer et al. | |
| 8,634,314 B2 | 1/2014 | Banka et al. | |
| 8,638,778 B2 | 1/2014 | Lee et al. | |
| 2006/0133404 A1* | 6/2006 | Zuniga | H04W 24/02 370/437 |
| 2007/0149249 A1* | 6/2007 | Chen | H04L 1/0026 455/561 |
| 2008/0293353 A1* | 11/2008 | Mody | H04K 3/44 455/1 |
| 2009/0019147 A1 | 1/2009 | Ahlers et al. | |
| 2011/0085461 A1 | 4/2011 | Liu et al. | |
| 2011/0149759 A1* | 6/2011 | Jollota | A61B 5/0024 370/252 |
| 2011/0255570 A1* | 10/2011 | Fujiwara | H04B 1/7143 375/133 |
| 2012/0155475 A1 | 6/2012 | Vasseur et al. | |
| 2012/0213062 A1* | 8/2012 | Liang | H04W 48/12 370/228 |
| 2012/0233308 A1 | 9/2012 | Van De Houten et al. | |
| 2012/0307653 A1 | 12/2012 | Vasseur et al. | |
| 2013/0022053 A1 | 1/2013 | Vasseur et al. | |
| 2013/0022083 A1 | 1/2013 | Vasseur et al. | |
| 2013/0024560 A1 | 1/2013 | Vasseur et al. | |
| 2013/0028103 A1 | 1/2013 | Hui et al. | |
| 2013/0121331 A1 | 5/2013 | Vasseur et al. | |
| 2013/0159479 A1 | 6/2013 | Vasseur | |
| 2013/0159486 A1 | 6/2013 | Vasseur | |
| 2013/0159550 A1 | 6/2013 | Vasseur | |
| 2013/0201858 A1 | 8/2013 | Varma et al. | |
| 2013/0223229 A1 | 8/2013 | Hui et al. | |
| 2013/0250811 A1 | 9/2013 | Vasseur et al. | |
| 2013/0336126 A1 | 12/2013 | Vasseur et al. | |
| 2013/0336316 A1 | 12/2013 | Sudhaakar et al. | |
| 2014/0003277 A1 | 1/2014 | Shim | |
| 2014/0022928 A1 | 1/2014 | Zingale et al. | |
| 2014/0092753 A1 | 4/2014 | Vasseur et al. | |

OTHER PUBLICATIONS

Fortunato, S., "Community Detection in Graphs", arXiv:0906.0612v2.pdf [physics.soc-ph]; Physics Reports 486, 75-174, Jan. 2010, 103 pages.

Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

Newman, et al., "Modularity and Community Structure in Networks", Proceedings of the National Academy of Sciences of the United States of America, Jun. 2006, vol. 103, No. 23, pp. 8577-8582, PNAS, Washington, DC.

Newman, M. E. J., "Analysis of Weighted Networks", http://arxiv.org/pdf/condmat/0407503.pdf, Phys. Rev. E 70, 056131, Jul. 2004, 9 pages.

Siddiky, et al., "An Efficient Approach to Rotation Invariant Face Detection Using PCA, Generalized Regression Neural Network and Mahalanobis Distance by Reducing Search Space", 10th International Conference on Computer and Information Technology, Dec. 2007, 6 pages, Dhaka, Bangladesh.

Ting, et al., "Variational Bayesian Least Squares: An Application to Brain-Machine Interface Data", Neural Networks, vol. 21, Issue 8, Oct. 2008, pp. 1112-1131, Elsevier.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Learning-Machine-Based Predictive and Proactive Computer Networking and Associated Monitoring", U.S. Appl. No. 61/923,910, filed Jan. 6, 2014, 105 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

* cited by examiner

A BAYESIAN NETWORK REPRESENTING THE JOINT PROBABILITY DISTRIBUTION OVER THREE RANDOM VARIABLES; X, Y, AND Z

BN FOR LINEAR REGRESSION

FIG. 6

USING LEARNING MACHINE-BASED PREDICTION IN MULTI-HOPPING NETWORKS

RELATED APPLICATION

This application claims priority to U.S. Provisional Application No. 61/923,910, filed Jan. 6, 2014, entitled: LEARNING-MACHINE-BASED PREDICTIVE AND PROACTIVE COMPUTER NETWORKING AND ASSOCIATED MONITORING, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, statistical information is collected relating to one or both of communication link quality or channel quality in a frequency-hopping network, in which packets are sent according to a frequency-hopping schedule that defines one or more timeslots, each timeslot corresponding to a transmission frequency. Also, a performance metric of a particular transmission frequency corresponding to a scheduled timeslot is predicted based on the collected statistical information. Based on the predicted performance metric, it is determined whether a transmitting node in the frequency-hopping network should transmit a packet during the scheduled timeslot using the particular transmission channel or wait until a subsequent timeslot to transmit the packet using another transmission frequency.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
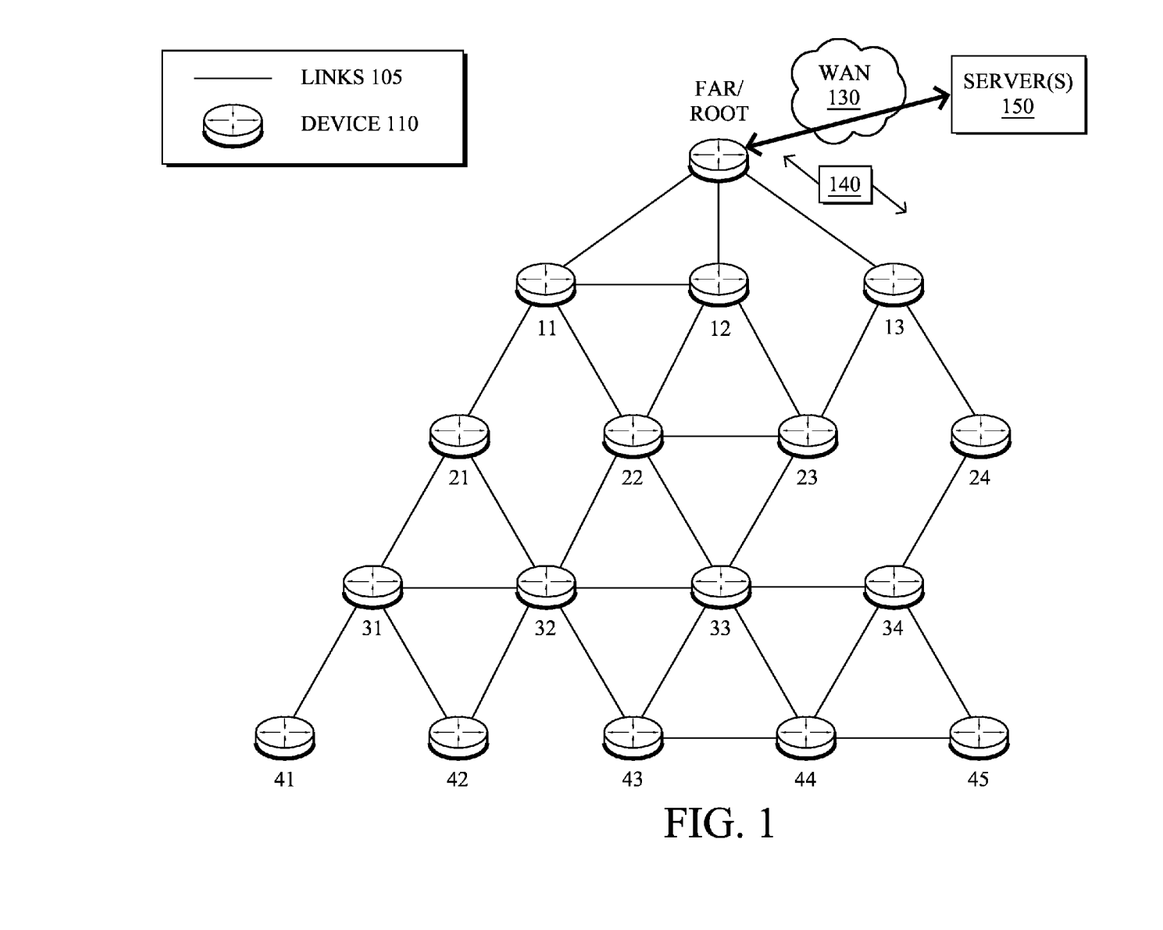
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
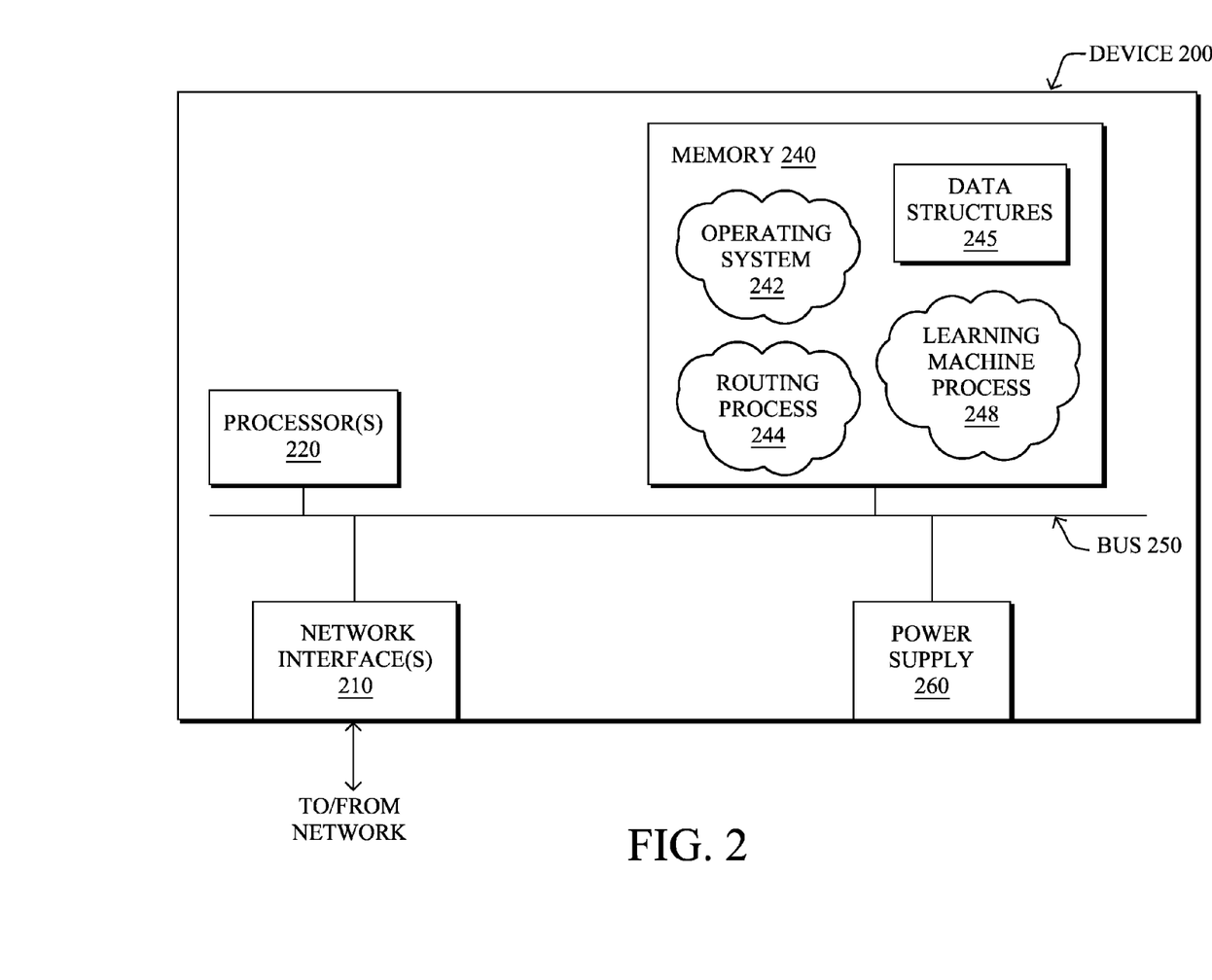
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
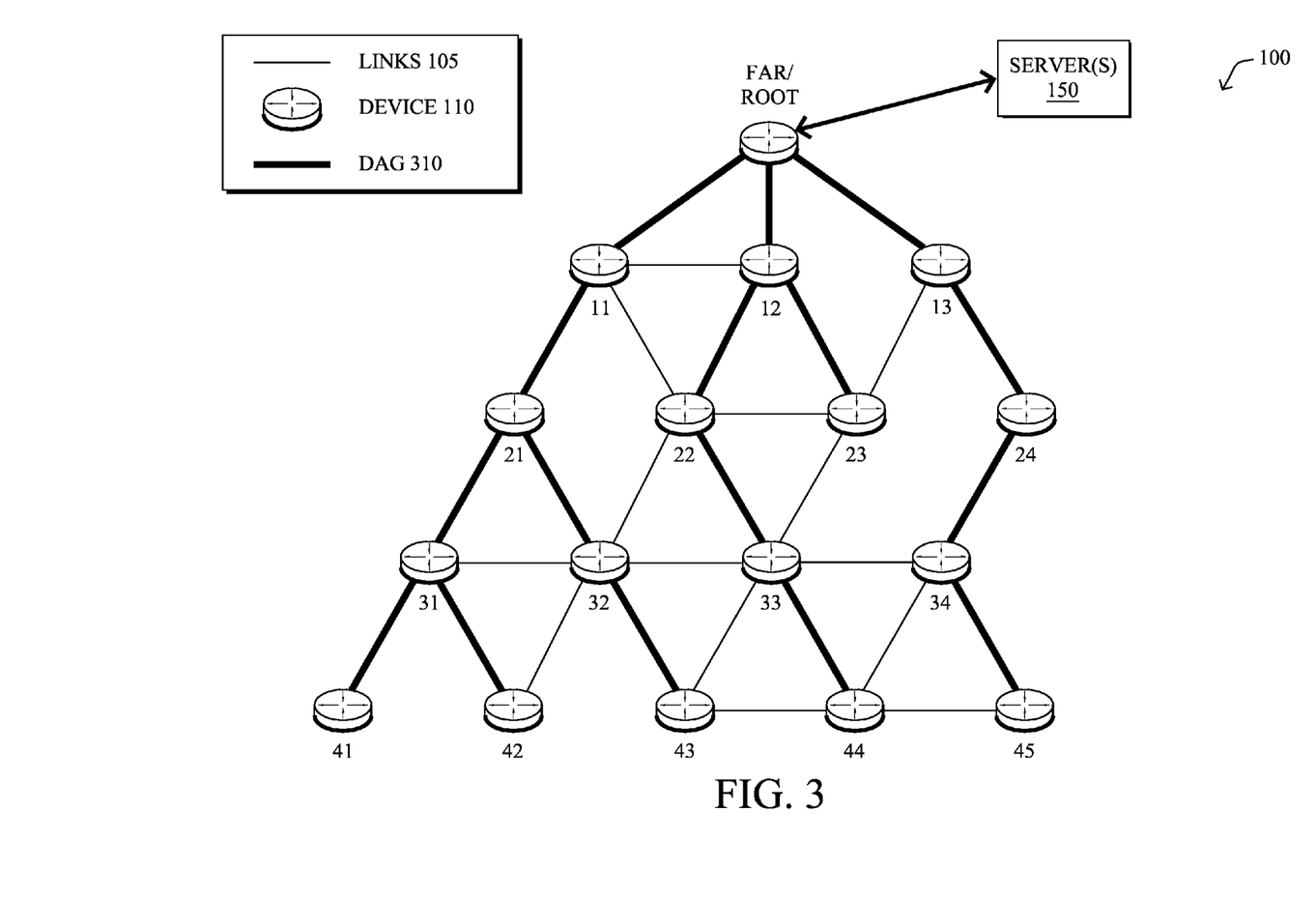
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Figure 4:
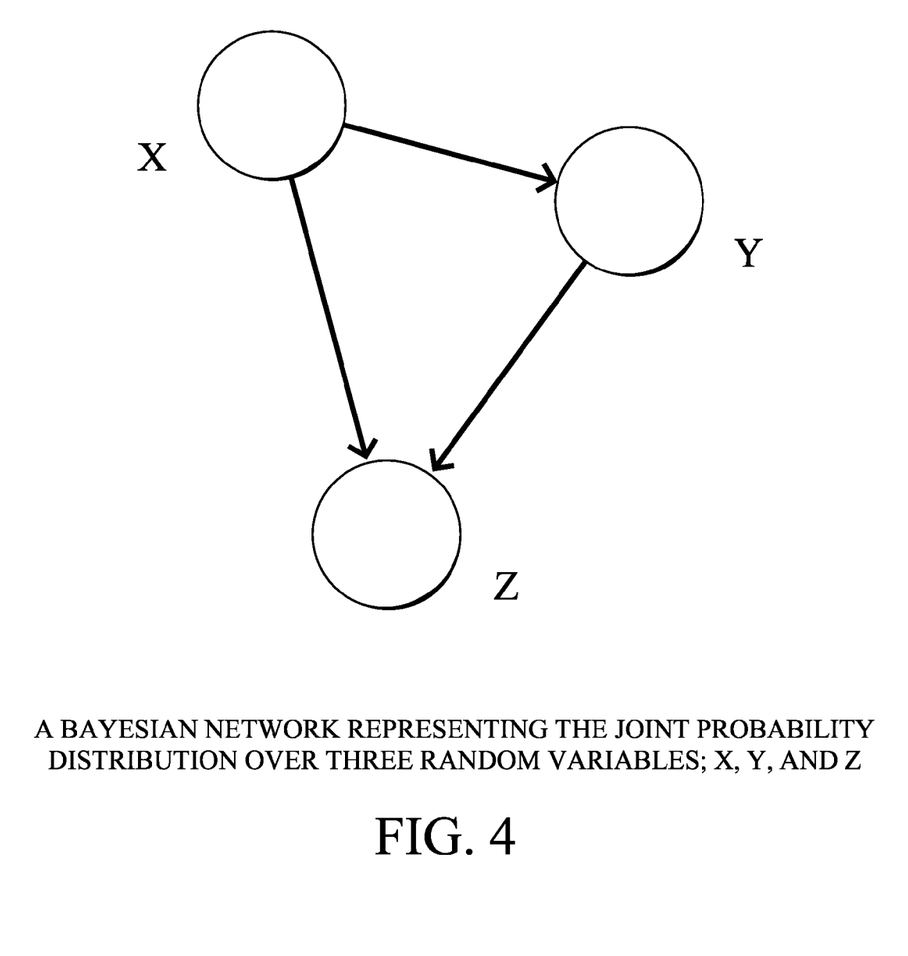
FIG. 4 illustrates an example Bayesian network.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y, Z) is given by a product of conditional probabilities:

$$P(X,Y,Z)=P(Z|X,Y)P(Y|X)P(X) \quad \text{(Eq. 1)}$$

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i = F(x_i) = b^T x_i + \epsilon \quad \text{(Eq. 2)}$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\epsilon$ is a Gaussian random variable used to model the uncertainty and/or the noise on the estimate $M_i$. The linear regression consists in finding the weight vector b that fulfills the maximum likelihood criterion (which coincides with the least square criterion when $\epsilon$ is Gaussian). In particular, the optimal b must minimize the Mean Squared Error (MSE):

$$MSE = \Sigma_i (b^T x_i - y_i)^2 / N$$

where N is the total number of input data points, i.e., i=1, . . . , N.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\epsilon$ is not Gaussian.

Figure 5:
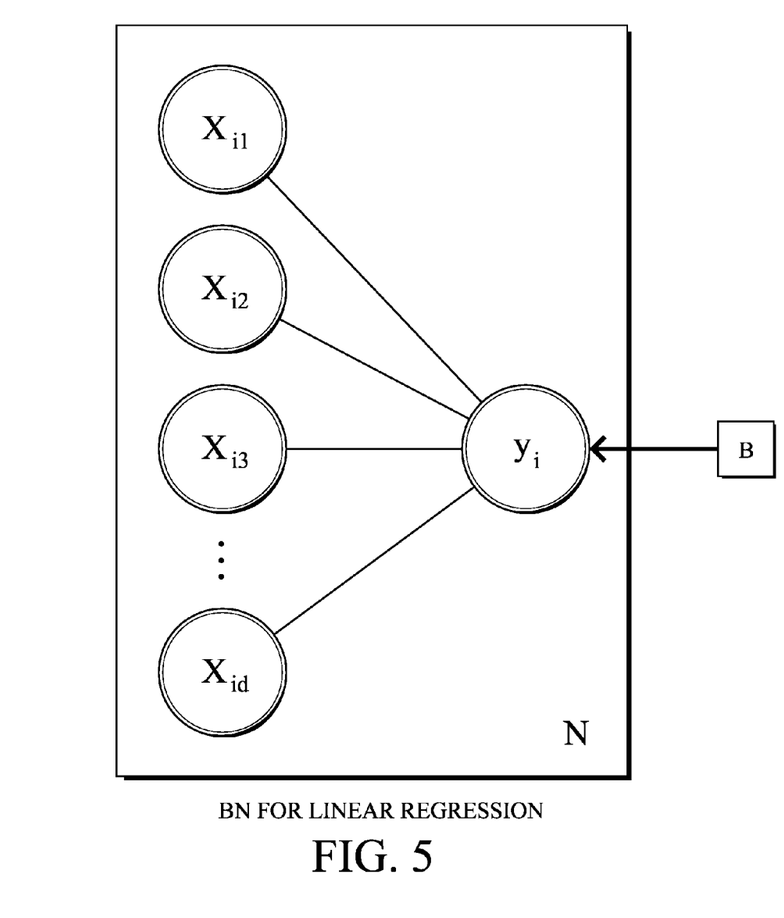
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables z, and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

Using LM-Based Prediction in Multi-Hopping LLNs

Frequency hopping is a very effective technique for preventing collisions among neighboring nodes and for increasing the network throughput; as a matter of fact, it also helps reducing the risk of DoS attacks (as it makes harder to perform jamming or eavesdropping). Low power link layers such as IEEE 802.15.4, in particular, use a simple yet effective method for hopping among the set of available frequencies. In particular, the unicast period of the node activity is split into several slots, each of them associated to a particular frequency by a pseudo-random function. A node willing to perform a unicast transmission will use the receive frequency of the target node at that instant (synchronization information is made available by each node periodically on each frequency). The frequency selection algorithm is therefore completely stateless: once a message is available for transmission, the current transmission channel is chosen and the data is sent. If no acknowledgement is received within a certain time, a back-off timer is scheduled and the next used frequency will depend on when such timer will expire. Note that random selection of frequencies is imposed by regulations in some countries.

In order to join the WPAN enabled with frequency hopping (e.g., an 802.15.4 WPAN), a node needs to synchronize on the frequency hopping schedule of its neighbors. Therefore, with respect to the published synchronization information, each node in the WPAN broadcasts its unicast reception schedule via a discovery beacon, which is not encrypted and sent on every frequency: this allows nodes joining the PAN to join. In greater detail, the discovery beacon message is sent to a broadcast destination WPAN and includes several information elements, most notably:

The WPAN SSID string

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). Notably, however, despite the unicast scheduling information explained above, the disclosed embodiments are applicable to, and may be used in conjunction with, any generic frequency hopping algorithm.

What has been noticed in the field is that it is not uncommon to have interference on specific frequencies, in which case packets may be sent over a link with very poor quality. As such the techniques herein detect channels that experienced bad quality and in turn postpone message transmission in order to use a channel perceiving a better signal quality. Note that this can be done without any change to the current standard, just by postponing packet transmission (potentially according to the traffic type). To this end, the techniques herein propose to adopt a Learning Machine (LM)-based approach, which allows a node to predict the behavior of a given channel based on the node-collected statistics. By leveraging such predicted information, the node can decide whether to wait for a better frequency or to transmit the packet immediately (the choice may also depend on the requirements of the particular traffic class).

Said differently, an aim of the techniques herein is to optimize frequency usage based on the predicted transmission success rate for that specific channel. Such prediction is computed by a learning machine and used in order to adopt the most appropriate transmission strategy according to the traffic type. A central LM is used in order to compute a prediction model that allows a node to predict the performance of a channel given the locally collected statistics. By using such a model, the node can adopt several strategies for deciding whether to transmit immediately or to postpone (also depending on the traffic type). The techniques herein also propose an adaptive mechanism for recomputing the prediction model in case the predicted values are deviating too much from the observed behavior.

Notably, the estimation of the value of certain feature(s) is a common problem in Machine Learning, sometimes denoted as regression, model fitting, function approximation, etc., depending on the (family of) technique(s) used. For instance, an Advanced Neural Network (ANN) may be used for estimating the age of people from a photo of their face. Therefore, in this case a LM (ANN) is used for modeling the relationship between facial characteristics and age. In another example, a Principal Component Analysis (PCA) may be combined with an ANN for estimating the position and orientation of a face in a given image. Therefore, here the LM (PCA+ANN) models a face and the relationship between facial characteristics and the orientation of the face. In the techniques herein, however, an LM is used for modeling the relationship between the characteristics of the link between two nodes (RSSI, LQI, ETX . . . ) and their Transmission Success Rate (TSR). Then, when a node wants to send a packet, this model is used for estimating the TSR of the link under its current conditions for different channels, which is used afterwards for deciding whether the packet should be sent immediately or after a certain period of time (i.e., on another channel). In particular, contrary to existing techniques, the techniques herein provide an estimation of TSR per channel in frequency-hopping communications by using a learning machine, in order to act on the actual transmission of a packet according to its type of traffic, e.g., CoS.

Operationally, the techniques herein optimize frequency selection in order to avoid lossy channels and optimize traffic quality and thus delays, based on the particular traffic requirements. Also, this allows saving the power required for failed transmissions, which is crucial on battery-operated nodes. The proposed approach focuses on the transmitting node (and is thus compatible with current standards). In particular, the transmitting node, instead of transmitting its data to the destination as soon as they are available (and, as a consequence, having no choice on frequency selection which is determined by the receiver's frequency scheduling) can decide to postpone packet transmission or select packets according to the prediction until the receiver's scheduling imposes the selection of a better channel.

Deciding whether to transmit or not a packet entails estimating several parameters. Postponing a packet transmission may indeed decrease the overall packet delay: if the node decides to transmit the packet on a lossy channel, the packet will likely be corrupted; in turn, this will involve the use of a backoff timer before retransmission is attempted and may eventually imply a high delay. Conversely, if the transmitter chooses to postpone transmission until a better channel can be used, the packet may be correctly received at the first attempt (as a bonus, better energy efficiency will be achieved). The optimal decision may also change depending on the type of traffic being transmitted: in case of delay-sensitive traffic, its transmission delay will need to be strictly bounded (in practice, postponing a packet transmission until the next slot could not be possible in case of traffic with too strict QoS requirements).

The first component of the techniques herein lies in the use of LM in order to estimate the behavior of the channel based on collected statistics; such prediction, in turn, will be used in order to select the appropriate transmission strategy. An LM model capable of predicting channel behavior will be computed on a higher-end node such as a FAR or network controller, and then downloaded on the nodes for actual prediction.

The second component of the techniques herein consists of a mechanism for collecting channel level statistics from each of the nodes of a WPAN (e.g., channel, RSSI, message destination, transmission success/failure) and using them for computing a LM model for channel performance estimation.

Statistic collection is triggered by the LM, which broadcasts a newly defined IPv6 message called Stats_Collect( ) message requesting every node in the WPAN to begin statistics collection. Note that the LM may then start collecting statistics on channel quality for specific nodes in the network as opposed to all nodes. Upon reception of such a message, nodes in the WPAN will begin exporting statistics including the characterization and performance of each channel in the form of TLVS in a newly defined IPv6 Stats_Report( ) message. In greater detail, the nodes will export the statistics for each used frequency and each of the node's neighbors. Note that the LM may either be located locally on a router/switch such as the Field Area Router (FAR), or remotely on a network controller or the NMS.

Once the LM has collected enough statistics, the model is trained in order to estimate the success rate of transmission for every single channel according to the collected features. Then, such a model will be pushed to the nodes in order for the node to estimate the Transmission Success Rate (TSR) for each channel on per neighbor basis.

Note that the same LM can be applied to several channels, in which case, the channels sharing the same LM will be specified.

For the sake of illustration, the LM could be implemented by using an ANN with input features that characterize a link between two nodes, such as RSSI, ETX, LQI, etc., and whose output is the TSR of the link between these two nodes. In this case, the training of the ANN could be performed by using a distributed training mechanism.

Another implementation could use a non-linear regression computed by using Principal Component Regression. In this case, the input features (independent variables) are the projection on the principal components of the features characterizing the link (RSSI, ETX, LQI, etc.) and the output feature (dependent variable) is the TSR. In this implementation, the principal components could be computed by using a distributed mechanism for computing incrementally the principal components of a dataset.

The advantage of using an LM for estimating the TSR, as opposed to simply computing the TSR based on past ACK/NACK observations, is that it allows for proactively adapting the node's behavior to varying channels. Indeed, a change in the RSSI, for instance, will imply a change in the estimation of the TSR given by the LM, that, in turn, will allow the node to proactively tune its behavior. On the contrary, if only the past TSR is taken into account, the node will need its past statistics to reflect the new channel behavior before being it is able to react (i.e., its average computed TSR will need to change significantly, which will happen after a number of new observations).

Note that in all of these implementation examples (and almost all the most common machine learning techniques), training the LM is the most computationally expensive part. Once the LM training has been carried out, the application of the computed model is inexpensive. This allows the use of these trained LMs on constrained nodes.

The second component of the techniques herein deals with the forwarding strategy for a given packet over a frequency when taking into account the TSR value computed by the LM.

In particular, assume that the message is ready for transmission at time slot S(i), associated with frequency F(i) (for a given destination node, a time slot S(i) is uniquely linked to a frequency F(i)).

In one embodiment, a node may use the LM received from the FAR for estimating the TSR every time it has to send a message to a given node N. In another embodiment, the node may re-estimate the TSR on a regular basis, say with a period of time T. This allows the node to avoid repeating the prediction of the TSR each time a packet has to be transmitted.

In another embodiment, after performing the prediction of the TSR for a given channel, the node can cache the set of input features which have been used for such prediction. When a following prediction is required, the node will compare the new set of input features with the cached one: if the distance between the two vectors is lower than a given threshold, the old output prediction value is returned. Notice that such an approach requires the predicting LM to be stateless.

Indeed, according to the features related to N (that can be the last known features of N) and the corresponding slots S(i), S(i+1), . . . S(i+M) (M being a tunable parameter), the node will estimate the TSR for transmission on F(i), F(i+1), . . . , F(i+M).

Then, based on these values, the node can determine the forwarding strategy FS( ), where FS( ) is a function that takes several input parameters into account:
The Class of Service of the packet to be transmitted; and
The estimated TSR for the next M channels in the frequency hopping schedule.

Based on such input information, the FS can choose one of the following behaviors:
Transmit the packet in the current slot.
Postpone packet transmission: the node can simply choose the slot with the highest success probability (this is the optimal strategy for bulk traffic, with no real-time requirements).
Choose one of the next M slots based on a mixed objective function, taking both delay and success probability into account. For example, the FS function may try to maximize the success probability while keeping the delay bounded under a certain value.

Note that the objective function of FS may vary with the CoS of the packet: for example, the node may want to minimize the average transmission delay, which can be computed using the TSR, the value of the back-off window in case of retransmission, the size of the packet, and the communication bandwidth. Conversely, the objective function may try to maximize the success rate for highly critical traffic (when losses must be avoided). In case of real-time sensitive traffic instead (when delay has to be strictly bounded), the FS may decide to use a slot with a lower TSR, since waiting for a better channel would break the real-time constraints.

The third component of the techniques herein is a method for tracking the accuracy of the prediction model computed by the LM. In particular, each node will monitor the behavior of the channel (e.g., its transmission success rate) and compare it with the predicted value issued by the model computed by the FAR.

In case the discrepancy between the prediction and the actual behavior is higher than a configurable threshold, the node sends a newly specified IPv6 message reporting the inconsistency alert message to the FAR.

The LM would monitor the alerts generated by the nodes in the WPAN and decides to trigger again data collection and model computation. Several policies (corresponding to as many embodiments) can be used for performing such a decision:
The LM can trigger a global model re-computation whenever the alert rate trespasses a configurable threshold.
The LM can leverage its topology information and look for alerts locality. If alerts mostly come from a given area of the WPAN, the FAR will infer that channel conditions in such an area are not rightly captured by the computed model. Therefore, the node will send unicast data collection message only to the nodes in that particular area and compute another model which will be specific only to that subset of nodes.

Figure 6:
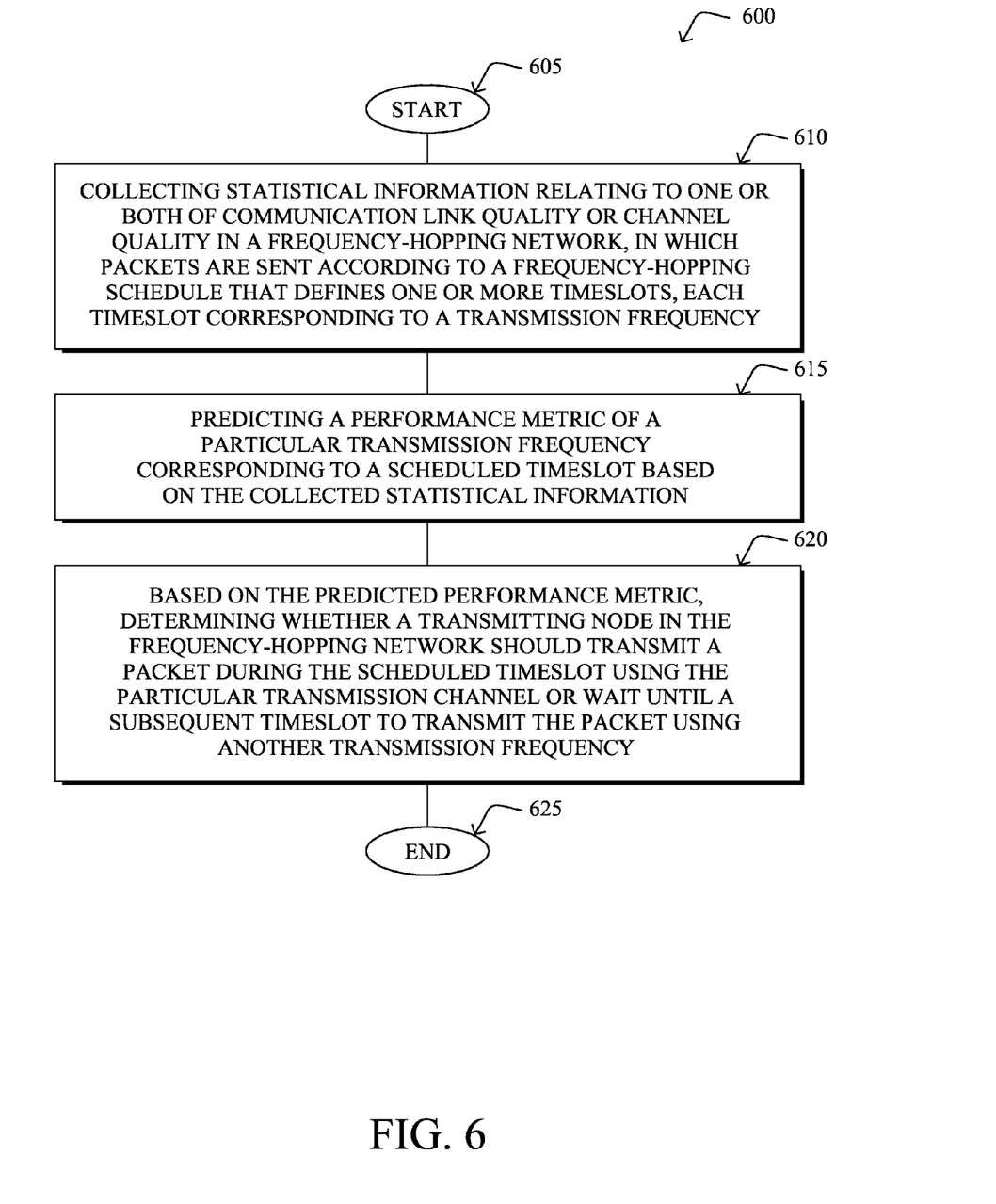
FIG. 6 illustrates an example simplified procedure for using learning machine-based prediction in multi-hopping networks.

FIG. 6 illustrates an example simplified procedure for using learning machine-based prediction in multi-hopping networks. The procedure 600 may start at step 605, continue to step 610, and so forth.

At step 610, statistical information is collected relating to one or both of communication link quality or channel quality in a frequency-hopping network, in which packets are sent according to a frequency-hopping schedule that defines one or more timeslots, each timeslot corresponding to a transmission frequency. Also, at step 615, a performance metric of a particular transmission frequency corresponding to a scheduled timeslot is predicted based on the collected statistical information. Based on the predicted performance metric, at step 620, it is determined whether a transmitting node in the frequency-hopping network should transmit a packet during the scheduled timeslot using the particular transmission channel or wait until a subsequent timeslot to transmit the packet using another transmission frequency. The procedure 600 may illustratively end at step 625. The techniques by which the steps of procedure 600 may be performed, as well as ancillary procedures and parameters, are described in detail above.

It should be noted that the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for using LM-based prediction in multi-hopping LLNs. In particular, the techniques herein allow optimization of channel usage and skipping bad-quality frequencies without the need to change current frequency hopping mechanisms. In addition, the techniques herein allow for tuning the frequency selection mechanism to the requirements of a particular traffic class.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for learning-machine-based predictive and proactive computer networking and associated monitoring, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   collecting statistical information relating to one or both of communication link quality or channel quality in a frequency-hopping network, in which packets are sent according to a frequency-hopping schedule that defines one or more timeslots, each timeslot corresponding to a transmission frequency;
   predicting a performance metric of a particular transmission frequency corresponding to a scheduled timeslot based on the collected statistical information, wherein the predicted performance metric is a transmission success rate of a particular communication link using the particular transmission frequency; and
   determining, based on the predicted performance metric, whether a transmitting node in the frequency-hopping network should transmit a packet during the scheduled timeslot using the particular transmission channel or wait until a subsequent timeslot to transmit the packet using another transmission frequency.

2. The method as in claim 1, wherein the predicted performance metric relates to the particular communication link used by the transmitting node.

3. The method as in claim 1, further comprising:
   calculating a prediction model using the collected statistical information based on a relationship between a quality of the particular communication link in the frequency-hopping network and the transmission success rate of the particular communication link, wherein
   the determining of whether the transmitting node should transmit the packet during the scheduled timeslot using the particular transmission channel is based on the prediction model.

4. The method as in claim 3, further comprising:
   tracking an accuracy of the prediction model; and
   recomputing the prediction model when the accuracy of the prediction model is suboptimal.

5. The method as in claim 1, further comprising:
   determining a type of traffic that traverses the transmitting node and a requirement associated with the type of traffic, wherein
   the determining of whether the transmitting node should transmit the packet during the scheduled timeslot using the particular transmission channel is further based on the determined requirement.

6. The method as in claim 1, further comprising:
   when it is determined to wait until a subsequent timeslot to transmit the packet, determining a better timeslot at which to transmit the packet, according to the frequency-hopping schedule.

7. The method as in claim 1, wherein the collecting of statistical information further comprises:
   sending an instruction to nodes in the network to report statistical information local to each respective node.

8. The method as in claim 1, further comprising:
predicting a performance metric of each transmission frequency corresponding to each scheduled timeslot, respectively, based on the collected statistical information.

9. The method as in claim 1, wherein the collected statistical information includes one or more of a signal strength indicator and a communication link quality indicator.

10. The method as in claim 1, wherein the predicting of the performance metric is performed by a learning machine (LM).

11. An apparatus, comprising:
one or more network interfaces that communicate with a frequency-hopping network;
a processor coupled to the one or more network interfaces and configured to execute a process; and
a memory configured to store program instructions which contain the process executable by the processor, the process comprising:
collecting statistical information relating to one or both of communication link quality or channel quality in the frequency-hopping network, in which packets are sent according to a frequency-hopping schedule that defines one or more timeslots, each timeslot corresponding to a transmission frequency;
predicting a performance metric of a particular transmission frequency corresponding to a scheduled timeslot based on the collected statistical information, wherein the predicted performance metric is a transmission success rate of a particular communication link using the particular transmission frequency; and
determining, based on the predicted performance metric, whether a transmitting node in the frequency-hopping network should transmit a packet during the scheduled timeslot using the particular transmission channel or wait until a subsequent timeslot to transmit the packet using another transmission frequency.

12. The apparatus as in claim 11, wherein the predicted performance metric relates to the particular communication link used by the transmitting node.

13. The apparatus as in claim 11, wherein the process further comprises:
calculating a prediction model using the collected statistical information based on a relationship between a quality of the particular communication link in the frequency-hopping network and the transmission success rate of the particular communication link, wherein
the determining of whether the transmitting node should transmit the packet during the scheduled timeslot using the particular transmission channel is based on the prediction model.

14. The apparatus as in claim 13, wherein the process further comprises:
tracking an accuracy of the prediction model; and
recomputing the prediction model when the accuracy of the prediction model is suboptimal.

15. The apparatus as in claim 11, wherein the process further comprises:
determining a type of traffic that traverses the transmitting node and a requirement associated with the type of traffic, wherein
the determining of whether the transmitting node should transmit the packet during the scheduled timeslot using the particular transmission channel is further based on the determined requirement.

16. The apparatus as in claim 11, wherein the process further comprises:
when it is determined to wait until a subsequent timeslot to transmit the packet, determining a better timeslot at which to transmit the packet, according to the frequency-hopping schedule.

17. The apparatus as in claim 11, wherein the collecting of statistical information further comprises:
sending an instruction to nodes in the network to report statistical information local to each respective node.

18. The apparatus as in claim 11, wherein the process further comprises:
predicting a performance metric of each transmission frequency corresponding to each scheduled timeslot, respectively, based on the collected statistical information.

19. The apparatus as in claim 11, wherein the collected statistical information includes one or more of a signal strength indicator and a communication link quality indicator.

20. The apparatus as in claim 11, wherein the apparatus is a learning machine (LM).

21. A tangible non-transitory computer readable medium storing program instructions that cause a computer to execute a process, the process comprising:
collecting statistical information relating to one or both of communication link quality or channel quality in a frequency-hopping network, in which packets are sent according to a frequency-hopping schedule that defines one or more timeslots, each timeslot corresponding to a transmission frequency;
predicting a performance metric of a particular transmission frequency corresponding to a scheduled timeslot based on the collected statistical information, wherein the predicted performance metric is a transmission success rate of a particular communication link using the particular transmission frequency; and
determining, based on the predicted performance metric, whether a transmitting node in the frequency-hopping network should transmit a packet during the scheduled timeslot using the particular transmission channel or wait until a subsequent timeslot to transmit the packet using another transmission frequency.

* * * * *